US011657066B2

(12) United States Patent
Chen et al.

(10) Patent No.: US 11,657,066 B2
(45) Date of Patent: May 23, 2023

(54) METHOD, APPARATUS AND MEDIUM FOR DATA SYNCHRONIZATION BETWEEN CLOUD DATABASE NODES

(71) Applicant: HUAWEI CLOUD COMPUTING TECHNOLOGIES CO., LTD., Gui'an New District (CN)

(72) Inventors: Chong Chen, Richmond Hill (CA); Jin Chen, Richmond Hill (CA); Shu Lin, Richmond Hill (CA); Chunsheng Sun, Markham (CA)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 115 days.

(21) Appl. No.: 17/107,588

(22) Filed: Nov. 30, 2020

(65) Prior Publication Data

US 2022/0171787 A1     Jun. 2, 2022

(51) Int. Cl.
| | |
|---|---|
| *G06F 15/16* | (2006.01) |
| *G06F 16/27* | (2019.01) |
| *H04L 67/1095* | (2022.01) |
| *G06F 16/901* | (2019.01) |
| *H04L 67/568* | (2022.01) |

(52) U.S. Cl.
CPC .......... *G06F 16/27* (2019.01); *G06F 16/9017* (2019.01); *H04L 67/1095* (2013.01); *H04L 67/568* (2022.05)

(58) Field of Classification Search
None
See application file for complete search history.

(56) References Cited

U.S. PATENT DOCUMENTS

| | | | |
|---|---|---|---|
| 10,289,496 B1 * | 5/2019 | Chopra | G06F 16/284 |
| 10,725,983 B2 | 7/2020 | Larson et al. | |
| 2007/0185852 A1 * | 8/2007 | Erofeev | G06F 16/184 |

(Continued)

FOREIGN PATENT DOCUMENTS

| | | |
|---|---|---|
| CN | 107209704 A | 9/2017 |
| CN | 108073656 A | 5/2018 |

OTHER PUBLICATIONS

Verbitski, A. et al., "Amazon Aurora: Design Considerations for High Throughput Cloud-Native Relational Databases", SIGMOD '17: Proceedings of the 2017 ACM International Conference on Management of Data, May 2017 pp. 1041-1052.

(Continued)

*Primary Examiner* — Alex Gofman

(57) ABSTRACT

Methods, processing units, and computer-readable media in a cloud-based database are described. Redo log records are applied to a page at a database replica only when an updated version of the page is requested at the database replica. A log cache may be used by a replica node of the database to track recent redo log records applicable to a given page. The recent redo log records stored in the log cache may be applied to update the page on-demand when an updated version of the page is requested. By applying only the redo log records applicable to pages that are currently being requested, processing resources may be used only to generate pages that are currently required. Methods for registering redo log records into the log cache by the master or replica server are also described.

20 Claims, 8 Drawing Sheets

(56) References Cited

U.S. PATENT DOCUMENTS

| | | | |
|---|---|---|---|
| 2011/0178984 A1* | 7/2011 | Talius | G06F 11/2094 |
| | | | 707/634 |
| 2011/0289289 A1* | 11/2011 | Leshinsky | G06F 11/1448 |
| | | | 711/E12.103 |
| 2014/0324785 A1 | 10/2014 | Gupta et al. | |
| 2016/0352813 A1* | 12/2016 | Johnson | G06F 11/2094 |
| 2017/0116278 A1* | 4/2017 | Baby | G06F 16/24554 |
| 2018/0329935 A1* | 11/2018 | Mugali | G06N 20/00 |
| 2020/0057752 A1* | 2/2020 | Tofano | G06F 9/54 |
| 2020/0186602 A1* | 6/2020 | Leshinsky | G06F 11/2058 |
| 2020/0293407 A1 | 9/2020 | Depoutovitch et al. | |

OTHER PUBLICATIONS

Antonopoulos, Panagiotis et al., "Socrates: The New SQL Server in the Cloud", SIGMOND '19: Proceedings of the 2019 International Conference on Management of Data, Jun. 2019, pp. 1743-1756.

Depoutovitch, A. et al., "Taurus Database: How to be Fast, Available, and Frugal in the Cloud", SIGMOD '20: Proceedings of the 2020 ACM SIGMOD International Conference on Management of Data, Jun. 2020 pp. 1463-1478.

U.S. Appl. No. 16/731,880, "Methods and Apparatuses for Generating Redo Records for Cloud-Based Database", filed Dec. 31, 2019.

* cited by examiner

METHOD, APPARATUS AND MEDIUM FOR DATA SYNCHRONIZATION BETWEEN CLOUD DATABASE NODES

FIELD

The present disclosure relates to distributed database management and in particular to methods, apparatuses and processor-readable media for synchronizing data between nodes of a cloud-based database.

BACKGROUND

Cloud computing is a form of network-based computing (e.g., Internet-based computing) that enables access to shared pools of configurable computing resources and higher-level services that can be rapidly provisioned with minimal management effort, often over the Internet. Cloud computing is another paradigm shift that follows the shift from mainframe based computing to client-server based computing that is implemented as services. Cloud computing service providers generally deliver three main types of services (referred to hereinafter as cloud computing services), infrastructure as a service (IaaS), platform as a service (PaaS), and software as a service (SaaS), by creating virtual machines on demand for use by customers. IaaS provides a computing infrastructure that can be rented and used by customers. The computing infrastructure comprises physical computing resources (e.g., processors, memory, storage, servers, networking components, etc.) that are virtualized and shared among customers. PaaS provides a platform that allows customers to develop, run, and manage software applications without having to build and maintain the computing infrastructure. SaaS provides software applications running on the computing infrastructure on demand over the Internet on a subscription basis.

Generally, one type of cloud computing service delivered by cloud computing service providers is in a database service. A database service is a PaaS that enables cloud computing service providers to deliver a secure, cost-effective, enterprise-grade databases to customers. In a database service, the database may be modified (e.g., use a write operation to modify data) by multiple different entities (e.g., different master servers). To track the changes made to the database, information describing the changes are typically stored as redo log records in a redo log. Thus, a redo log contains information describing a history of all changes made to the contents of a database, which may be used to reconstruct contents of the database (e.g., in the event of a failure). The redo log records may also be used to ensure that replicas of the database correctly reflect the data contained in the original (or master) database.

One limitation of cloud-based databases arises in applying the redo log records to update data at the database replicas. Each replica needs to support read-only transactions to access database data retrieved from cloud storage. However, each replica typically also has a local data cache (also called a buffer pool) to hold data locally for satisfying read requests received from a client. When the database master updates database data, the data stored locally at the replica in its buffer pool is considered to be expired or out of date. In order for a database replica to read the updated data, data must be reconciled or synchronized between the database master and database replica. Such a data synchronization method should be able to accomplish three distinct functions: first, it should update the replica's list of transactions performed by the master. Second, it should invalidate or deprecate data in the replica's buffer pool that is expired as a result of the active transactions, so that an incoming read request at the replica does not result in accessing the outdated local version of the data. Third, it should update an index value stored at the replica that indicates which database master transactions have been processed or registered by the replica (such as a log sequence number, or LSN, as described in detail below). Typically, a data synchronization method performed by a replica will receive redo log records from the master, deprecate locally stored data based on the contents of the redo log records, apply the redo log records to the locally stored data to update the locally stored data, and update the locally stored index value indicating which redo log records in the sequence of transactions have been applied. Read requests received by the replica after a piece of local data (e.g. a data page) has been deprecated but before it is updated may result in lag, either because the replica is waiting for the local copy to be updated, or because the replica must retrieve the updated data from remote storage.

In performing a data synchronization method as described above, two performance metrics may be considered. First, a data visibility lag between the master and the replica should be minimized (ideally). The data visibility lag indicates the time lag between when a master makes a change the database data and commits the change, and when a replica registers the change to deprecate its locally stored data. Second, a query throughput of the replica should be maximized. The query throughput of the replica reflects the number or volume of read requests that can be satisfied by the replica in a given time period (e.g., every second). In existing approaches to data synchronization between masters and replicas, when the database master has a heavy write update workload (i.e., it is processing and committing a large number of database data updates in a given time period, such as every second), both of these metrics may suffer: the data visibility lag may grow, and the query throughput may drop.

Two general approaches have been used to sync data between database masters and database replicas: sequentially applying redo log records, or proactively applying redo log records in parallel. In sequential redo log record application, the replica only maintains a single version of each data page in its buffer pool. After the replica receives a set of redo log records, it will parse the redo log records to identify all data pages updated by the redo log records that are included within a single mini-transaction (MTR, as described in detail below) within the set of redo log records. The replica will then acquire exclusive locks for all these data pages that are present within the replica's buffer pool. The redo log records within the mini-transaction will be applied to the corresponding locally stored (locked) data pages in parallel to generate updated local copies of those data pages. Once the local data pages have been updated, the replica will release the exclusive locks on those pages. The list of active transactions stored by the replica will then be updated to indicate which transactions have been processed (i.e. applied to the locally stored pages).

The sequential approach to redo log record application has limitations. Redo logs may contain many MTRs, and MTRs have dependencies. Since there is only a single version of each page in the replica's buffer pool, in order to guarantee consistency, the replica has to process each MTR sequentially. This may increase data visibility lag and decrease query throughput due to contention for page locks.

In proactive parallel redo log record application, the replica buffer pool may store multiple versions of a given data page. Each data page in the buffer pool is read-only, meaning that once it is created, it will not be modified again. This allows lock-free read access to the data page. After the replica receives a set of redo log records, it will parse the redo log records to identify all data pages updated by the redo log records that are included within any MTRs up to a certain point in the sequence of transactions (e.g., a target index value such as a target LSN). The replica then identifies all data pages within this group of MTRs. For each such data page that is present within the replica's buffer pool, the data page is marked with an updated index value indicating the point in the sequence of transaction at which the page expires (e.g., an expire LSN). There is no need to lock the data pages. The redo log records to be applied to a given data page are then applied to a local copy of the data page in the buffer pool to generate an updated version of the page. Note that the local copy of the page may only be updated by the redo log records if the local copy of the data page has an expire LSN equal to or higher (i.e. later in sequence) than the starting LSN of the redo log records (e.g., a set of redo log records covering the period from LSN=1000 to LSN=2000 can only be used to update a local copy of a data page if the local copy of the data page has an expire LSN of 1000 or more). Typically, the replica only receives records with a LSN range beginning at the visible LSN of the replica; thus, the local copy of a data page may only be updated if the page's expire LSN is equal to the visible LSN of the replica (sometimes denoted as expire LSN=MAX). Within the group of MTRs, the application of the redo log records may be done in parallel on multiple data pages. After applying the redo log records, the list of active transactions stored by the replica will then be updated to indicate which transactions have been processed (i.e. applied to the locally stored pages) and update a visible index value (e.g., visible LSN) to the target index value (e.g., target LSN). When a read request received by the replica needs to read a data pages in the buffer pool, the visible index value is used to access the correct version of the data page to guarantee consistency.

In contrast to the sequential redo log record application approach, this proactive parallel approach enables lock-free data page access for both log application (i.e. data page updates) and data page read requests. It may speed up the performance of applying redo log records by enabling parallelization of redo log record application to a certain extent. However, it still has limitations. First, this approach results in the generation and storage in memory of many unused data pages in the buffer pool of the replica, because it creates multiple new version of each data page. These locally stored copies occupy space in the buffer pool, increasing buffer pressure and thereby resulting in lower throughput. Second, applying the redo log records consumes processor resources (e.g., CPU cycles) at the database replica server. Processor resources at the replica are constrained; when the use of processor resources is at its maximum, such as during periods of high transaction volume at the database master, the redo log record application process cannot catch up with the rate of updates received from the database master. The data visibility lag will grow over time, and this growing lag will also reduce replica query throughput. Third, the input and output loads on cloud storage may be very high in this approach. The local copies of data pages at the replica can only be updated when the data page is in the replica's buffer pool at redo log record application time. If the data page is not in the buffer pool and a redo log record needs to be applied to the last version of the data page, the data page must be retrieved from remote cloud storage, increasing input/output pressure on the cloud storage as the cloud storage system is forced to generate a large number of small data page reads. This may further reduce the replica's query throughput. Fourth, this approach may result in high data visibility lag. An updated data page is only visible to a new read request after all redo log records within the group of MTRs have been applied, potentially increasing the data visibility lag of any read request for a data page affected by the redo log records within the group of MTRs.

Accordingly, it would be useful to provide a way of applying redo log records to synchronize data at the database replica that overcomes one or more of the limitations of existing approaches identified above.

SUMMARY

The present disclosure describes examples in which redo log records are applied to a page at a database replica only when the current version of the page is requested at the database replica. This feature may help to reduce consumption of memory resources and processing resources.

In some examples, a log cache may be used by a replica node of the database to track recent redo log records applicable to a given page. The recent redo log records stored in the log cache may be applied to update the page on-demand when the current version of the page is requested. By applying only the redo log records applicable to pages that are currently being requested, processing resources may be used only to generate pages that are currently required. This may focus processing resources on keeping frequently-requested pages up to date, potentially reducing latency which may be incurred if all pages are updated even if they are never requested.

As used herein in the context of redo log records, the terms "apply" or "application" may be used in context to mean a process by which a data page of a database is altered or updated using the contents of a redo log record. One or more redo log records may be applied to an out-of-date version of a data page to update the contents of the data page to reflect the changes to database content recorded in the redo log record(s).

As used herein, the term "page" means a data page of a database.

As used herein, the term "database master server" shall refer to a server or other node in a cloud-based database that is configured to handle modifications to the database including requests to insert, update, or delete database records. The term "database replica server" shall refer to a server or other node in the cloud-based database that is configured to handle only read requests, e.g., requests to select database records. Database replica servers may maintain replicas of some or all of the data pages of the database based on redo log records received from the database master server, as described herein with reference to example embodiments. In some configurations, a cloud-based database may be a multi-master database with more than one database master server; in such cases, each additional database master server may implement some of the on-demand redo log application techniques described herein with reference to database replica servers, and so may be considered to fall within the definition of "database replica server" for the purpose of the described embodiments. Database master servers and database replica servers may be collectively referred to as "database servers".

In some aspects, the present disclosure describes a method for synchronizing data of a database replica server of a cloud-based database comprising data stored in pages.

The method comprises receiving from a client, at the database replica server, a request for a desired page of database data. In response to receiving the request for the desired page a stored version of the desired page is retrieved. One or more redo log records associated with the desired page are retrieved from a log cache. The one or more redo log records are applied to the stored version of the desired page to generate an updated desired page. The updated desired page is sent from the database replica server to the client.

In some aspects, the present disclosure describes a processing unit. The processing unit comprises a processing device, and a memory. The memory stores instructions that, when executed by the processing device, cause the processing unit to perform the functions of a database replica server in a cloud-based database comprising data stored in pages. The database replica server is configured to receive, from a client, a request for a desired page of database data, and in response to receiving the request for the desired page, retrieve a stored version of the desired page, retrieve one or more redo log records associated with the desired page from a log cache, apply the one or more redo log records to the stored version of the desired page to generate an updated desired page, and send, to the client, the updated desired page.

In some aspects, the present disclosure describes a computer-readable medium storing instructions thereon to be executed by a processor device in a cloud-based database comprising data stored in pages, the instructions, when executed, causing operations in a database replica server of the cloud-based database to receive, from a client, a request for a desired page of database data, and in response to receiving the request for the desired page, retrieve a stored version of the desired page, retrieve one or more redo log records associated with the desired page, apply the one or more redo log records to the stored version of the desired page to generate an updated desired page, and send, to the client, the updated desired page.

In some examples, the cloud-based database is a multimaster cloud-based database, and the database replica server is a database master server.

In some examples, the log cache is part of the database replica server.

In some examples, the log cache is part of the cloud-based database separate from the database replica server.

In some examples, the database replica server retrieves the stored version of the desired page from a buffer pool of the database replica server.

In some examples, the database replica server retrieves the stored version of the desired page from a page store of the cloud-based database.

In some examples, the method further comprises, prior to retrieving the one or more redo log records associated with the desired page, storing a plurality of redo log records to the log cache. The plurality of redo log records comprise at least one of the one or more redo log records associated with the desired page.

In some examples, the step of storing the plurality of redo log records to the log cache is performed by a database master server.

In some examples, the step of storing the plurality of redo log records to the log cache is performed by the database replica server.

In some examples, the method further comprises, prior to storing the plurality of redo log records to the log cache, determining that the log cache has insufficient memory available to store the plurality of redo log records, and evicting one or more redo log records stored in the log cache.

In some examples, each redo log record of the plurality of redo log records is associated with a page, storing the plurality of redo log records to the log cache comprises storing each redo log record of the plurality of redo log records, in a lookup table of the log cache, in association with a lookup table entry corresponding to a page associated with the redo log record, and retrieving the one or more redo log records from the log cache comprises retrieving one or more redo log records stored in association with a lookup table entry corresponding to the desired page.

In some examples, the stored version of the desired page is associated with a log sequence number, and retrieving the one or more redo log records comprises retrieving one or more redo log records stored in association with log sequence numbers higher than the log sequence number of the stored version of the desired page.

In some examples, the method further comprises, prior to retrieving the one or more redo log records associated with the desired page, determining that the log cache has insufficient memory available to store a plurality of redo log records, evicting one or more redo log records stored in the log cache, storing the plurality of redo log records to the log cache (the plurality of redo log records comprising at least one of the one or more redo log records associated with the desired page), and updating a visible log sequence number of the database replica server to a value equal to an ending log sequence number associated with the plurality of redo log records.

In some examples, the processing unit comprises the log cache, and the instructions, when executed by the processing device, further cause the processing unit to perform the functions of a log cache.

In some examples, the log cache comprises a plurality of stored redo log records (each stored redo log record of the plurality of stored redo log records being stored in a lookup table of the log cache in association with a lookup table entry corresponding to a page), and retrieving the one or more redo log records from the log cache comprises retrieving one or more stored redo log records stored in association with the lookup table entry corresponding to the desired page.

In some examples, the instructions, when executed by the processing device, further cause the processing unit to perform the functions of a buffer pool, and the stored version of the desired page is retrieved from the buffer pool.

In some examples, the stored version of the desired page is associated with a log sequence number, and retrieving the one or more redo log records comprises retrieving one or more redo log records stored in association with log sequence numbers higher than the log sequence number of the stored version of the desired page.

In some examples, the database replica server is further configured to, prior to retrieving the one or more redo log records associated with the desired page, determine that the log cache has insufficient memory available to store a plurality of received redo log records, evict one or more stored redo log records stored in the log cache, store the plurality of received redo log records to the log cache, the plurality of redo log records comprising at least one of the one or more redo log records associated with the desired page, and update a visible log sequence number of the database replica server to a value equal to an ending log sequence number associated with the plurality of received redo log records.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present disclosure describes examples in the context of cloud computing, using an active-active architecture. Although certain system diagrams and flowcharts are shown and discussed, these are provided as examples only and are not intended to be limiting.

Example Cloud Computing Architecture

Figure 1:
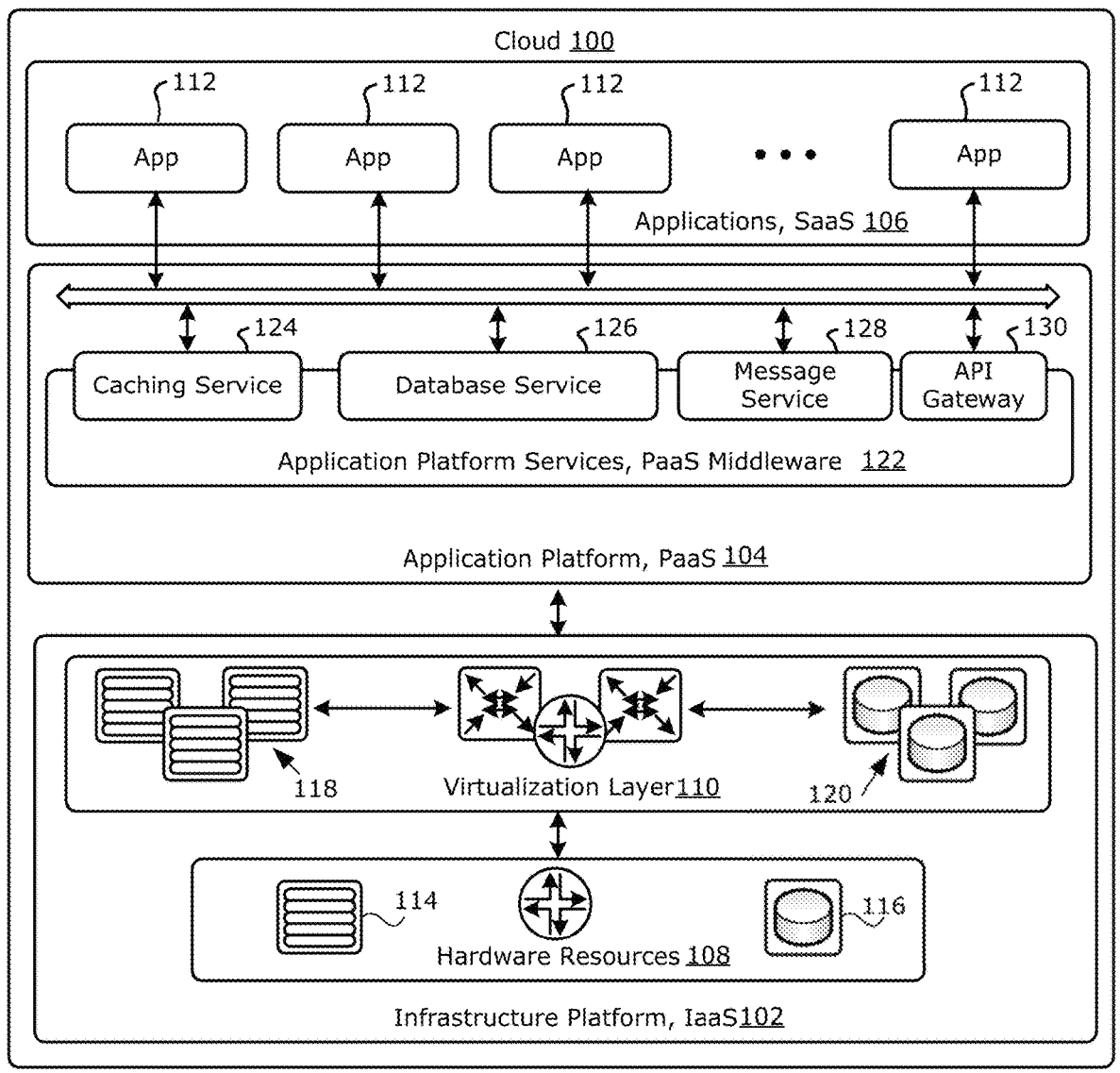
FIG. 1 is a block diagram illustrating a cloud computing architecture for delivering cloud computing services, in accordance with example embodiments described herein.

FIG. 1 is a logical block diagram schematically illustrating a cloud computing architecture that can deliver cloud computing services. The illustrated logical diagram of the cloud computing architecture 100 (referred to hereinafter as the cloud 100) generally comprises an infrastructure platform 102 (e.g., infrastructure as a service (IaaS) layer), an application platform 104 (e.g., platform as a service (PaaS) layer), and applications 106 (e.g., software as a service (SaaS) layer). The infrastructure platform 102 comprises the physical hardware resources 108, and a virtualization layer 110 that presents an abstraction of the physical hardware resources 108 to the application platform 104. The abstraction presented by the virtualization layer 110 depends on the requirements of the applications 112 being hosted on the application platform 104. The physical hardware resources 108 include physical machines or servers 114 that include physical processing resources 114 (e.g., central processing units (CPUs), graphic processing units (GPUs), accelerators, tensor processing units (TPUs)), physical storage servers 116 that include storage resources such as memory (e.g., static random access memory (SRAM), dynamic random access memory (DRAM), synchronous DRAM (SDRAM), read-only memory (ROM), persistent storage devices (e.g., hard disk drives, optical drives, or a combination thereof), and networking resources (not shown) that are generally resident within a data center. A data center, as will be understood in the art, includes a collection of the physical hardware resources 108 (typically in the form of servers) that can be used as a collective computing resource comprising processing, storage, and networking resources. Within a data center, a plurality of servers can be connected together to provide a computing resource pool upon which virtualized entities can be instantiated. Data centers can be interconnected with each other to form pools of computing resources connected to each by connectivity resources. The connectivity resources may take the form of physical connections such as Ethernet or optical communications link.

The virtualization layer 110 supports a flexible and efficient multi-tenancy run-time and hosting environment for applications 112 by providing IaaS facilities. The virtualization layer 110 includes a virtualization manager or hypervisor (not shown) that may provide a security and resource "sandbox" for each application 112 being hosted by the application platform 104. Each "sandbox" may be implemented as a Virtual Machine (VM) 118 that may include an appropriate operating system and controlled access to virtualized storage resources 120.

The virtualization of the physical hardware resources 108 by the virtualization layer 110 is considered to be foundational technology for the cloud 100. Virtualization of is a technology that allows for the creation of virtual computing resource pools of computing resources (e.g., processing, storage, and networking resources) connected to each by connectivity resources. Virtualization may take the form of instantiating VMs 118 that, to another entity on a network and to software executed on the VM 118, is no different than a physical computing device. A VM 118 has its own set of computing resources (e.g., processing, storage, and connectivity resources), upon which an operating system can be executed. The VM 118 can have a virtual network interface that can be assigned a network address. Between the underlying resources and the VM 118, there is typically a hypervisor (not shown) that manages the resource isolation and network interactions. One of the purposes of a VM 118 is to provide isolation from other processes running on the cloud 100. When initially developed, a VM 118 was a mechanism to allow different processes to operate without concern that a single errant process would be able to cause a complete system crash. Instead, an errant process would be contained to its own VM 118. This isolation allows for each VM 118 to have its own set of network interfaces. Typically, a single underlying computing resource can support a plurality of virtualized entities.

It will be appreciated by those skilled in the art that a more recent development has been the use of containers in place of VMs 118. As mentioned above, each VM 118 typically includes its own operating system which typically increases redundant computing, storage, and connectivity resource usage. Containers allow a single operating system (OS) kernel to support a number of isolated applications. In place of a hypervisor that allows each VM 118 to run its own OS, a single OS hosts containers that are responsible for enforcing the resource isolation that would otherwise be provided by the VM 118.

The application platform 104 provides the capabilities for hosting applications 112 and includes application platform services 122. The application platform services 122 provide a set of middleware application services and infrastructure services to the applications 112 hosted on the application platform 104. Applications 112 hosted on the application platform 104 may run on either the VMs or the physical machines. In the example depicted in FIG. 1, the application platform services 122 include a cache service system 124 for in-memory data storage, a database service 126 for applications, a message service 128 for publishing messages to subscriber customers, and an application program interface (API) gateway service 130 that enables customers to create, publish, and maintain APIs to access other cloud services. It will be appreciated by those skilled in the art that the application platform services 112 may provide other middleware application services to customers, such as notification services, run-time services, and the like. Applications 112 from customers may be deployed and executed within a respective VM 118 or physical machine 114.

The database service 126 may be implemented using a cloud-based (or cloud-native) database architecture, discussed further below. Some terminology that will be used in the present disclosure is now discussed.

In the present disclosure, a database refers to an organized collection of data, generally stored and accessed electronically from a computer system.

A Database Management System (DBMS) is a "software system" that enables a user (e.g., database administrator) to define, create, maintain and control access to the database. The DBMS is the "software" that interacts with end users (e.g., client users), applications 112, and the database itself to capture and analyze the data. The DBMS acronym is sometime extended to indicate the underlying database model, such as RDBMS for relational database model, OODBMS or ORDBMS for object (orientated) database model, and ORDBMS for object-relational database model. Other extensions can indicate some other characteristic, such as DDBMS for a distributed database management system. The core functionality provided by a DBMS is the storage, retrieval and update of data. A fully-fledged general purpose DBMS generally provides the following functionalities:

Data storage, retrieval and update
User accessible catalog or data dictionary describing the metadata
Support for transactions and concurrency
Facilities for recovering the database should it become damaged
Support for authorization of access and update of data
Access support from remote locations
Enforcing constraints to ensure data in the database abides by certain rules A database engine (or storage engine) is the underlying software component that a DBMS uses to create, read, update and delete (CRUD) data from a database. External interaction with the database may be via an application program that interfaces with the DBMS.

A database transaction (also simply referred to as transaction) is a unit of work performed within a DBMS.

Database pages (or simply referred to as pages) are the internal basic structure to organize the data in the database files. A database page is a unit of storage whose size may be configurable on a system-wide, database-wide, or conglomerate-specific basis. A page may be identified by identifier(s), such as a page identifier and space identifier.

A redo log is a file which logs a history of all changes made to the database. A redo log (or more generally a database log) may be stored as a file. Each redo log contains one or more redo log records (or more generally database log records). A redo log record, also called a redo entry or log entry, holds a group of change vectors, each of which describes or represents a change made to a single block or page in the database. The term redo log may stem from specific DBMS models, however a redo log may also be commonly used in a generic manner, to refer to a database log. MySQL™ is an example database model that uses the term redo log; MySQL™ is an example database model that may be used to implement examples described herein. It should be understood that the present disclosure may be equally applicable to other database models. A database model is a type of data model that determine a logical structure of the database and determines in which manner data can be stored, organized, and manipulated. An example of a database model is the relational model, which uses a table based format to store, organize, and manipulate data.

A redo log record may include further information, such as a page identification identifying the page to which the redo log record is applicable. In some embodiments, the page identification may include a page identifier (ID) and space ID. A redo log record may also include a sequence number, such as a log sequence number (LSN), indicating the location of the redo log record within the redo log. Generally, the LSN is assigned to a log record in the order in which the redo log record is entered in the GFB. The redo log records in the GFB are typically ordered in increasing LSN. The log records may be parsed or processed to determine which log records are to be applied to which page (e.g., based on page ID). In some embodiments, the log records may be parsed until the end of the predefined boundary (e.g., a GFB boundary, as described below) is reached.

A cloud-native database (referred to herein as a cloud-based database) is a type of database service which may be built, deployed and delivered through the cloud. It is a PaaS which provides databases that allow an organization, end-user and their respective applications to store, manage, and retrieve data from the cloud.

Example Cloud Database Architecture

Figure 2:
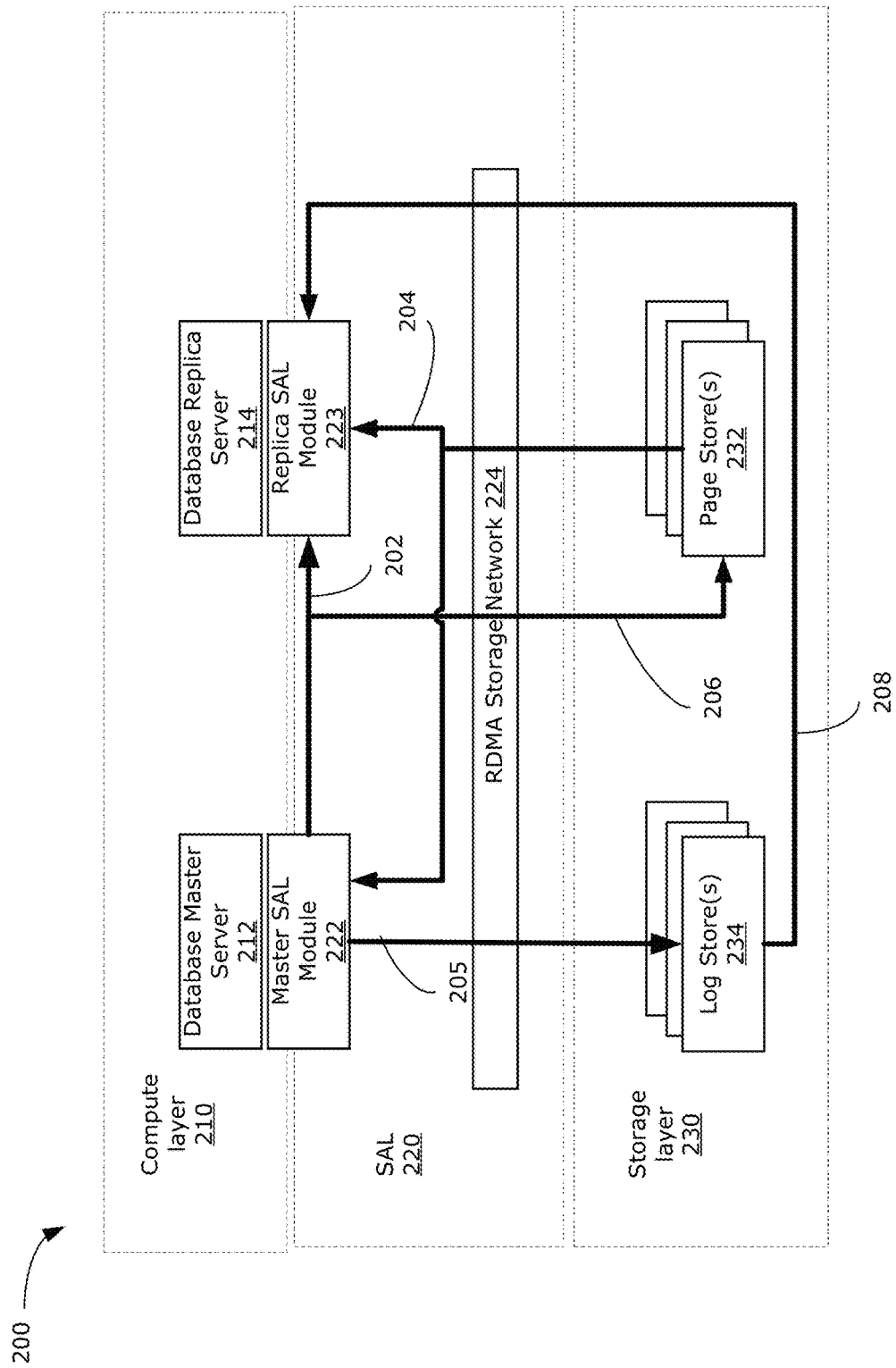
FIG. 2 is a simplified logical diagram for an example architecture of a cloud-based database, in accordance with example embodiments described herein.

FIG. 2 illustrates a simplified logical block diagram of an architecture of a cloud-based database 200, in which compute and storage layers 210, 230 are separated. The cloud-based database 200 in FIG. 2 introduces an additional layer (namely a storage abstraction layer (SAL) 220) that separates the compute and storage layers 210, 230. The SAL 220 offers a layer of abstraction, in which physical resources (e.g., physical memory and physical processing resources), provided by the IaaS layer 102, may be pooled, in order to serve the compute and storage layers 210, 230. The separation of compute and storage layers 210, 230, and such abstraction of physical resources (and hence pooling of physical resources) may enable better scalability and load balancing. For example, the compute layer includes a cluster of servers (e.g., master and replica servers) and the storage layer includes a cluster of storage servers.

The compute layer 210 includes a database master server 212 (also referred to simply as master 212) and one or more database replica servers 214 (also referred to simply as replica(s) 214). The database master server 212 and database replica server(s) 214 may be generally referred to as database servers 212, 214. In some examples, database servers 212, 214 may also be referred to as nodes in the cloud-based database 200. For example, there may be a single database master server 212 and one or more database replica servers 214. Generally, the database master server 212 handles all modifications to the database (including requests to insert, update, or delete database records), and the database replica server(s) 214 handle only read requests (i.e., request to select database records). Database transactions, which include multiple statements such as insert, update, delete, select (i.e. read request), are handled by the database servers 212, 214 in the compute layer 210. It should be noted that the database servers 212, 214 may not be physical hardware servers, but rather software running on the physical processing resources of the cloud (i.e., in the IaaS layer 102). A database server 212, 214 may be software (also referred to as an instance of the database server 212, 214) running on a virtual machine 118 or a container provided by the IaaS layer 102 of the cloud. Generally, instances of the database servers 212, 214 may be considered to have physicality because any instance is implemented on a physical machine. For simplicity the present disclosure will refer to the database servers 212, 214 rather than referring to instances of the database servers 212, 214.

Each database server 212, 214 communicates with the storage abstraction layer (SAL) 220 via a respective master SAL module 222 or replica SAL module 223. In the context of FIG. 1, the SAL 220 may be considered to span the database service 126 and the virtualized storage resources 120, and provides a layer of abstraction that pools physical resources to serve both the database service 126 and the virtualized storage resources 120. It should be noted that the SAL 220 is not a typical layer of a traditional database service (e.g., database services provided by traditional cloud service providers). The cloud-based database 200 described herein includes the SAL 220, and may use the SAL 220 to implement functions (as discussed further below) that provide advantages over traditional database services. Each SAL module 222, 223 may be a software instance that is implemented in the SAL 220. For simplicity, an instance of the SAL module 222, 223 may be referred to herein as simply the SAL module 222, 223. The SAL module 222, 223 provides the functions of the logical SAL 220. In some examples, one or more functions of the SAL module 222, 223 may instead be implemented in the storage layer 230. The SAL 220 serves to isolate the front-end (provided by the compute layer 210), which is client-facing, from the way the database is organized and managed.

Data (including redo logs and pages of the database, as discussed below) is stored in the storage layer 230. The storage layer 230, in this example, is accessible via a network, for example a remote direct memory access (RDMA) network. The storage layer 230 may be a distributed storage system provided by, for example, the virtualization layer 120, of the IaaS 102 that provides a relatively fast, reliable and scalable storage. The storage layer 230 includes one or more page stores 232, which stores pages containing data, and one or more log stores 234, which stores one or more redo logs. The page store(s) 232 serves read requests (that is, requests to read data from one or more pages) received from a database server 212, 214. The page store(s) 232 may recreate any version of a page that may be requested by a database server 212, 214. In the cloud-based database 200, the page store(s) 232 are running on by a cluster of storage resources (not shown). Each page store 232 receives all redo log records that have been produced for the page that page store 232 is responsible for, and consolidates (or applies, with conflict resolution if applicable) the redo log records to a database page.

Although described in the context of a single database above, it should be understood that, in some examples, two or more databases may be managed using the cloud-based database 200 (e.g., with logical separation separating individual databases). Each database is divided into small fixed-size subsets of pages, which may be referred to as slices. Each page store 232 manages a respective plurality of slices. The slices managed by a single page store 232 may include slices with pages from different databases. The page store server receives redo log records only for the pages that belong to the slices managed by that page store server. Generally, a database can have multiple slices, and each slice may be replicated to multiple page stores 232 for durability and availability (e.g., in the event one particular page store 232 is unavailable, another page store 232 to which the slice has been replicated may be used to continue to serve requests to access data from (i.e., read from) or modify data stored in (i.e., write to) that slice).

Operations performed by the master SAL module 222 include sending redo log record updates from the database master server 212 to the database replica server(s) 214 (arrow 202); sending information regarding the physical location of the redo log (i.e. identifying the log store 234) to enable the database replica server(s) 214 to know where to access (i.e., read) the latest redo log records (also arrow 202); accessing (i.e., reading) pages from the page store(s) 232 (dashed arrow 204); and writing redo log record to the log store(s) 234 (arrow 205) and page store(s) 232 (arrow 206). Operations performed by the replica SAL module 223 include receiving redo log record updates from the database master server 212 (arrow 202); and receiving updates to redo log records from the log store(s) 234 (arrow 208). The SAL 220 is also responsible for creating, managing, and destroying slices in the page store(s) 232 and assigning pages to the slices. In some examples, each SAL module 222, 223 may be linked to a database server 212, 214; in other examples, each SAL module 222, 223 may be implemented by another component in the cloud-based database 200 (e.g., may be implemented by another server that is not linked to a database server 212, 214, such as a storage server). Each database server 212, 214 may be served by a respective SAL module 222, 223 (as shown). In some examples, a single instance of the SAL module serving the functions of both the master SAL module 22 and replica SAL module 223 may serve two or more database servers 212, 214. In some examples, a single instance of such a SAL module may serve all database servers 212, 214 in the cloud-based database 200. In some examples, the SAL 220 may be implemented using independent SAL module(s) 222, 223 that may be running on a VM 118, in a container, or a physical server 114.

Example Processing Unit

Figure 3:
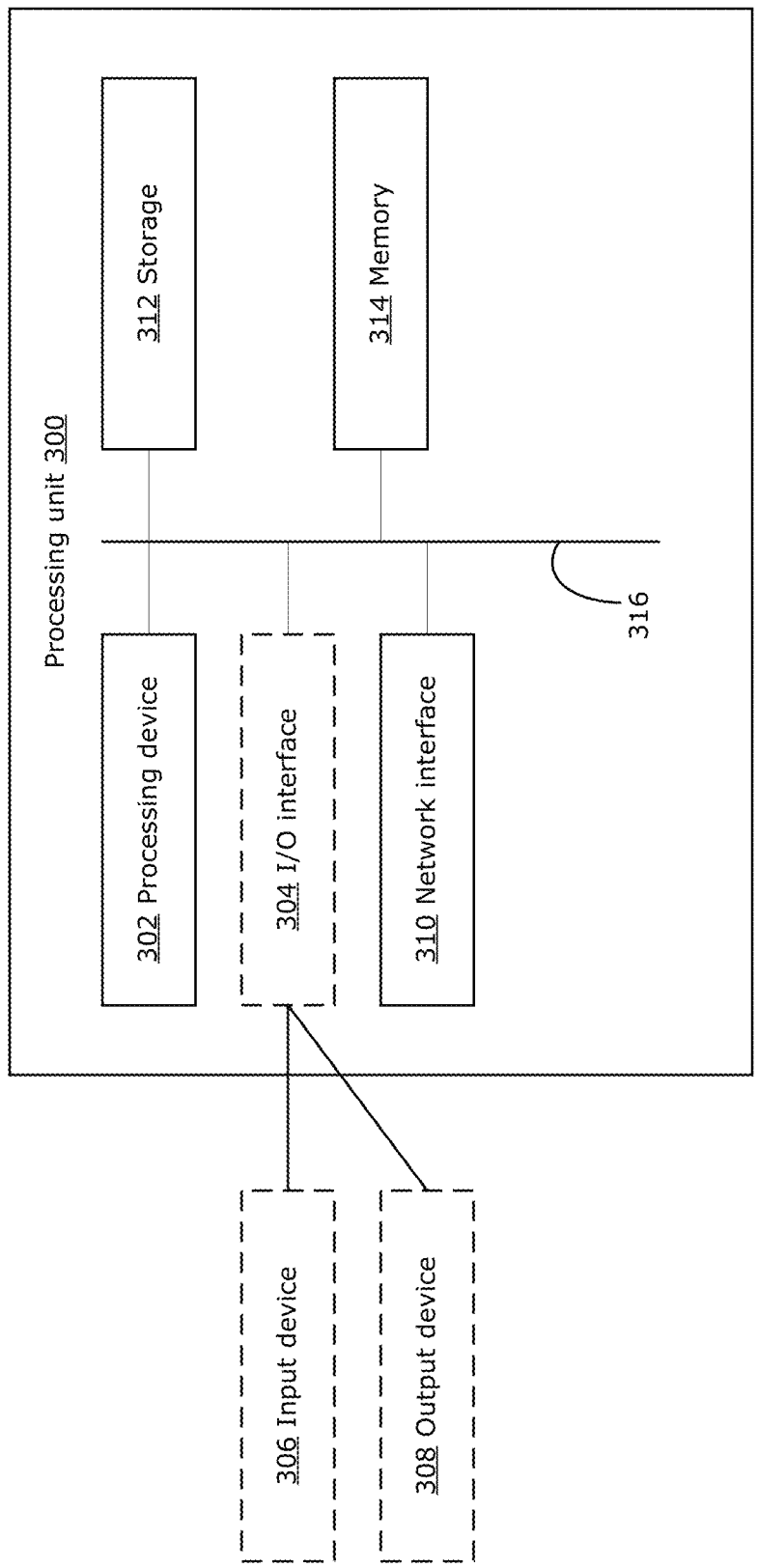
FIG. 3 is a block diagram illustrating a simplified example of a processing unit, in accordance with example embodiments described herein.

FIG. 3 is a block diagram illustrating a simplified example of a processing unit 300, which may be used to implement a physical machines or servers 114 or physical storage server 116. Alternatively, processing unit 300 may be an illustration of a virtual machine 118 provided by the virtualization layer 110 of the IaaS 102. Other examples suitable for implementing embodiments described in the present disclosure may be used, which may include components different from those discussed below. Although FIG. 3 shows a single instance of each component, there may be multiple instances of each component in the processing unit 300.

The processing unit 300 may include one or more processing devices 302, such as a processor, a microprocessor, a digital signal processor, an application-specific integrated circuit (ASIC), a field-programmable gate array (FPGA), a dedicated logic circuitry, a dedicated artificial intelligence processor unit, or combinations thereof. The processing unit 300 may also include one or more optional input/output (I/O) interfaces 304, which may enable interfacing with one or more optional input devices 306 and/or optional output devices 308.

In the example shown, the input device(s) 306 (e.g., a keyboard, a mouse, a microphone, a touchscreen, and/or a keypad) and output device(s) 308 (e.g., a display, a speaker and/or a printer) are shown as optional and external to the processing unit 300. In other examples, there may not be any input device(s) 306 and output device(s) 308, in which case the I/O interface(s) 304 may not be needed.

The processing unit 300 may include one or more network interfaces 310 for wired or wireless communication with entities in the cloud-based database architecture. The network interface(s) 310 may include wired links (e.g., Ethernet cable) and/or wireless links (e.g., one or more antennas) for communications across the different layers 210, 220, 230 of the cloud-based database architecture 200.

The processing unit 300 may also include one or more storage units 312, which may include a mass storage unit such as a solid state drive, a hard disk drive, a magnetic disk drive and/or an optical disk drive.

The processing unit 300 may include one or more memories 314, which may include a volatile or non-volatile memory (e.g., a flash memory, a random access memory (RAM), and/or a read-only memory (ROM)). The non-transitory memory(ies) 314 may store instructions for execution by the processing device(s) 302, such as to carry out examples described in the present disclosure. For example, in the case where the processing unit 300 is used to implement a SAL module 222 or 223, the memory(ies) 314 may store instructions for executing the functions of the SAL module 222, 223 and for managing redo records, as discussed further below.

The memory(ies) 314 may include other software instructions, such as for implementing an operating system and other applications/functions. In some examples, the processing unit 300 may additionally or alternatively execute instructions from an external memory (e.g., an external drive in wired or wireless communication with the processing unit 300) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The processing unit 300 may also include a bus 316 providing communication among components of the processing unit 300, including those components discussed above. The bus 316 may be any suitable bus architecture including, for example, a memory bus, a peripheral bus or a video bus.

Reference is again made to FIG. 2. Whenever a database is created or expanded by a cloud service provider, the master SAL module 222 selects a page store 232 associated with the database (or selects any suitable page store 232 if the database is to be newly created) and creates slices on the selected page store 232. The database master server 212 maintains redo log records in a group flush buffer (GFB). Any redo log records that record database transactions that have been committed by a client of the cloud-based database to the compute layer 210 may be stored in the GFB. Redo log records stored in the GFB may be flushed to the master SAL module 222 to be updated in the log store(s) 234. The process of transmitting redo log records from a buffer and clearing the buffer may be referred to as "flushing" the buffer. The master SAL module 222 adds the log records to currently active log stores 234, to help ensure durability of the redo log records. After all the transmitted redo log records are successfully added by the master SAL module 222 to all log stores 234, the successful storage of the redo log records can be acknowledged by the master SAL module 222 to the database master server 212. In some embodiments, the redo log records may be parsed, either before the master SAL module 222 added the log records to the log stores 234, while the master SAL module 222 is in the process of adding the log records to the log stores 234, or after the master SAL module 222 has successfully added the redo log records to the log stores 234, and then distributed to per-slice log buffers (SLBs) in the master SAL module 222. Each SLB corresponds to a set of one or more slices (e.g., an SLB may correspond to the slices stored by a single log store 234) and holds only the log records (or portions thereof) pertaining to pages stored in its respective set of slices. Each SLB may be flushed when it is full and/or at predefined time intervals (e.g., when a timeout counter expires).

Example Method for Processing Redo Log Records

Figure 4:
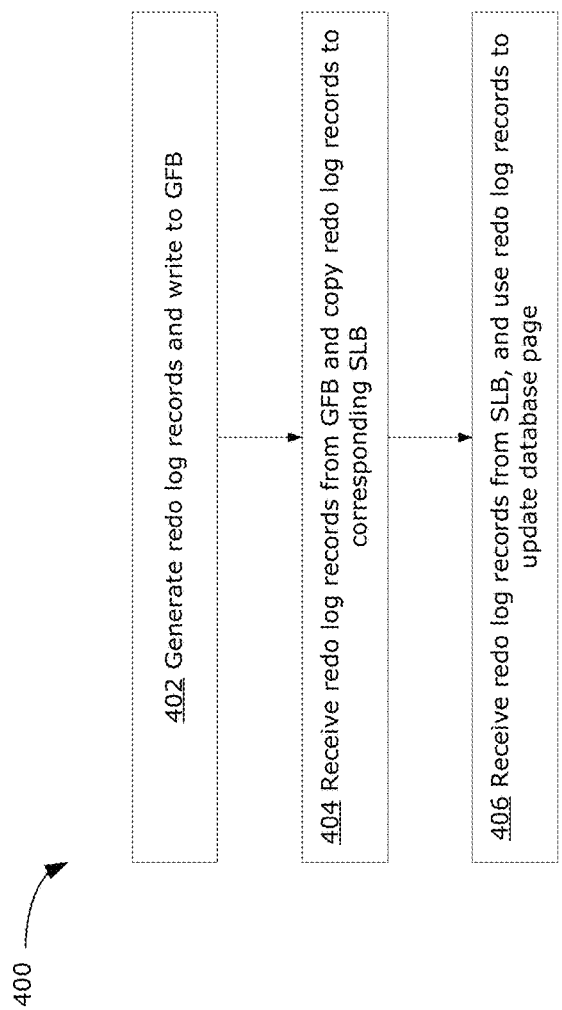
FIG. 4 is a flowchart illustrating an example method, performed by multiple software entities in the cloud-based database, to process redo log records, in accordance with example embodiments described herein.

FIG. 4 illustrates an example method 400, performed by multiple software entities (e.g., variously by instances of the database master server 212, the master SAL module 222 and the page store(s) 232 as discussed below) in the cloud-based database 200, to process redo log records. It should be understood that the method 400 provides a simplified overview and is only an example.

At 402, redo log records are generated by the database master server 212 and added (i.e., written) to the GFB. The database master server 212 flushes (or transmits) the redo log records stored in the GFB to the SAL 220 (via the master SAL module 222). For example, the GFB may be flushed when a certain buffer size is reached (e.g., the GFB is full) and/or at certain time intervals. The GFB contains a group of committed redo log records (i.e., redo log records that record database transactions that have been committed by a client of the cloud-based database 200) from the database master server 212.

At 404, the master SAL module 222 receives redo log records from the GFB, parses the redo log records and copies the redo log records to the SLB corresponding to the appropriate slice. For example, the master SAL module 222 parses the redo log records to identify which database page is affected by a given redo log record, and hence which is the appropriate slice to which that given redo log record should be applied. The master SAL module 222 then copies that given redo log record to the SLB corresponding to the appropriate slice.

At 406, the page store(s) 232 receives redo log records from the appropriate SLB, parses the redo log records, and uses the redo log records to update data stored in the corresponding database page. For example, the page store for a given page parses the redo log records that apply to that given page. All the data updates indicated by the redo log records that apply to that given page are applied so that the given page correctly reflects the modifications indicated by the redo log records.

The redo log records may be in the form of multiple mini-transactions (MTRs). MTR is a database term that may be used to describe a minimal unbreakable group of redo log records that should not be separated, in order to maintain consistency of the database. Database consistency means that replicated data (including replicated data in replica page store(s) 232 and replicated redo log records in replica log store(s) 234) correctly reflect the database transactions that have been committed in the compute layer 210. The term MTR may be commonly used in the context of MySQL™; however, in the present disclosure the term MTR is generally used to refer to a minimum, unbreakable atomic unit of redo log records, without being limited to any specific database implementation. In the present disclosure, an "atomic unit" is used to refer to a group of redo log records that should be applied together in order to correctly reflect the data stored in the database (e.g., in order for replica page store(s) 232 and replica log store(s) 234 to correctly replicate a database operation by the database master server 212). An MTR is an example of such an "atomic unit". Thus, for example, a B+ tree includes a root page node and its leaf page nodes. When a tree split or merge is to be performed, this B+ tree data structure may require updating several B+ tree page nodes together. All these page updates are included in multiple redo log records that should be grouped together into a single MTR, since the redo log records need to be applied atomically (i.e., as an inseparable group). The group of redo log records within a single MTR may be defined by an MTR boundary. Thus, the MTR boundary may be implicit information that defines which log records should be processed together. A database engine may implement algorithms to determine the start and end of an MTR. For example, the MySQL™ InnoDB™ engine generates MTR END redo records, to identify the MTR boundary; an MTR END redo record indicates that the next record is the first record of a new MTR. Such implicit or explicit indicators of the MTR boundary may be used by the master SAL module 222, when parsing redo log records, to determine the start and end of an MTR.

In traditional databases services, redo log records in the GFB may be flushed to storage directly. However, in cloud-based database (i.e., cloud-native database) 200, redo log records may be sent to different page stores 232 based on their slice partition. A database usually has tens or even hundreds of slices. Each slice has a corresponding SLB. The contents (e.g., redo log records) of a SLB for a given slice are flushed to page stores 232 corresponding to that slice. For example, an SLB may be flushed when a certain buffer size is reached (e.g., the SLB is full) and/or at certain time intervals.

Database servers (both master and replica(s) 212, 214) generally need to access versions of pages within the MTR boundary to help ensure database consistency during page processing. Multiple MTRs may be contained in a GFB, and redo log records within a single GFB may be defined by a GFB boundary. Thus, accessing redo log records within a GFB boundary should ensure that each MTR boundary is also respected. The database master server 212 always accesses (i.e., reads) the latest version of pages, which will be within the GFB boundary. The database replica server 214 lags behind the database master server 212. The version of the page accessible by the database replica server 214 may be made accessible as updates to the database page are completed based on at least the MTR boundary. That is, an updated page version (i.e., a version of a page that has been updated) may be made accessible to (i.e., to be read by) the database replica server 214 only after all redo log records within the same single MTR boundary have been processed. Respecting the MTR boundary in this manner will help to ensure database consistency. However, the boundary for processing records may be larger, for example a GFB boundary for a single GFB or even for a group of GFBs.

Example Database Replica Synchronization Methods

As described above, the state of the pages stored in the buffer pool of the database replica server 214 lags behind the latest transactions committed by the database master server 212. The version of the page accessible by the database replica server 214 may be made accessible (i.e. visible to read requests) as updates to the database page are completed, based on at least the MTR boundary. In existing approaches to redo log record application, as described in the Background section above, an updated page version (i.e., a version of a page that has been updated) may be made accessible to (i.e., to be read by) the database replica server 214 only after all redo log records within the same single MTR boundary have been processed. In some cases, as described above, this may result in growing data visibility lag and/or decreased query throughput at the database replica server 214.

To address these limitations, example embodiments described herein may provide on-demand application of redo log records to a page stored in the buffer pool of the database replica server 214 only when the page is requested by a client of the database replica server 214. Specific pages stored by the database replica server 214 may thus be synchronized with the latest transactions committed by the database master server 212 while removing the step of redo log record application (e.g., sequential or proactive parallel redo log record application, as described in the Background section above) from the critical path of the ongoing synchronization process, thereby potentially avoiding the problem of growing data visibility lag over time. Instead of requiring that all local pages be updated as redo log records are received, embodiments are described in which only requested pages are updated.

In some embodiments, a log cache at the database replica server 214 may be used to reduce input/output pressure on the cloud storage (e.g. log store 234 and/or page store 232). The log cache may be used in some embodiments to keep track of the latest page update (e.g., current LSN) from the database master server 212 and provide a lookup interface to allow the database replica server 214 to obtain redo log records applicable to a particular page key (e.g., applicable to a requested page) and a range of versions.

Like the proactive parallel redo log record application approach described in the Background section above, various embodiments described herein may require that multiple versions of a page be stored in the buffer pool of the database replica server 214. As in the existing approach, each page in the buffer pool may be designated to be read-only, meaning that once it is created, it will not be modified again. This may enable lock-free read access to the page in response to read requests.

Figure 5:
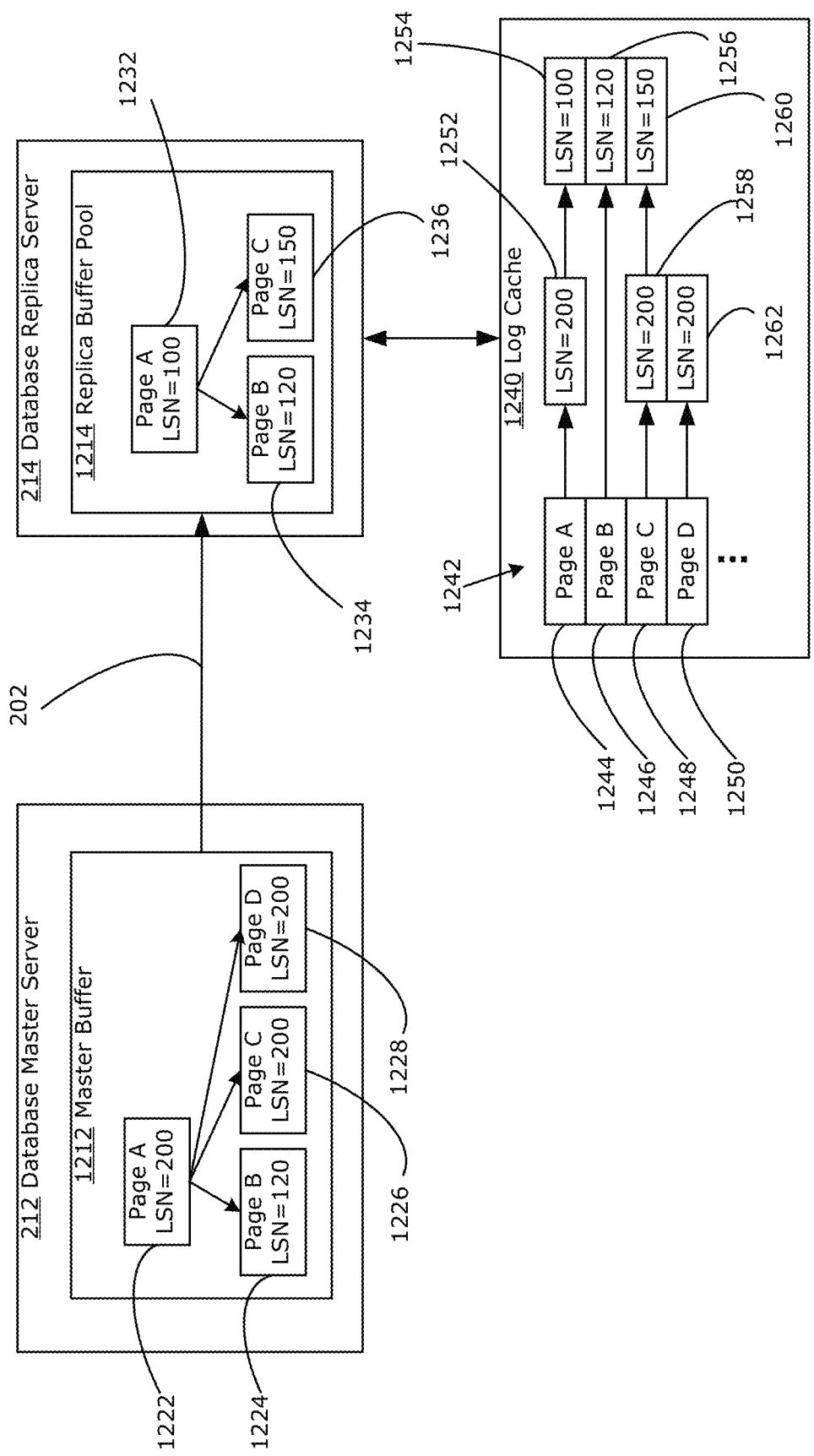
FIG. 5 is a block diagram showing an example of synchronization of data pages stored in the buffer pool of a database replica server with recently committed transactions of a database master server using a log cache, in accordance with example embodiments described herein.

FIG. 5 illustrates a block diagram showing an example of synchronization of data pages stored in the replica buffer pool 1214 of a database replica server 214 with recently committed transactions of a database master server 212 using a log cache 1240.

The database master server 212 includes a master buffer pool 1212 for storing the latest database pages. The database pages in the master buffer pool 1212 are shown as a B+ tree structure containing four database pages: Page A at LSN=200 1222, Page B at LSN=120 1224, Page C at LSN=200 1226, and Page D at LSN=200 1228. Page D has been newly added to the B+ tree. Page A, Page C and Page D have to be updated atomically to guarantee consistency. Hence, page A moves up from LSN 100 to LSN 200, page C moves up from LSN 120 to LSN 200, and page D added at LSN 200. The database master server 212 will generate corresponding redo log records for Page A, Page C and Page D in a single MTR.

The database replica server 214 includes a replica buffer pool 1214 for storing local versions of data pages. The locally stored pages in the replica buffer pool 1214 are shown as a B+ tree structure containing three pages: a local version of Page A corresponding to LSN=100 1232, a local version of Page B corresponding to LSN=120 1234, and a local version of Page C corresponding to LSN=150 1236. It will be appreciated that the locally stored versions of Page A 1232 and Page C 1236 are out of date relative to the most recent versions of Page A 1222 and Page C 1226 at the database master server 214 at LSN=200.

A log cache 1240 is used to store redo log records after they are flushed from the master buffer pool 1212. In some embodiments, the log cache 1240 is part of the database replica server 214. In other embodiments, it may be implemented elsewhere in the cloud based database 200, such as within the replica SAL 223 or as a separate node. A log cache 1240 that is implemented as a separate logical process from the database replica server 214 running on a separate physical device may be referred to as "separate from" the database replica server 214. The log cache 1240 is used to store redo log records, which are either received directly from the database master server 212, e.g. via arrow 202 of FIG. 2, or from the log store 234, e.g. via arrow 208 of FIG. 2. After the database master server 212 writes the redo log records corresponding to the most recent versions of Page A 1222, Page C 1226, and Page D 1228 (all at LSN 200) to the log store 234 (i.e. arrow 205 in FIG. 2), and before the database replica server 214 moves up its read view and makes those changes visible to read requests from clients (i.e. the database replica server's visible LSN is increased to 200), the redo log records corresponding to Page A 1222, Page C 1226, and Page D 1228 at LSN=200 are written (i.e. registered) into the log cache 1240 by the database master server 212 or the database replica server 214. Example methods for registering redo log records into the log cache 1240 are described in greater detail below with reference to FIGS. 6A and 6B.

The log cache 1240 organizes the contents received redo log records based on the page intended to be updated by the redo log record. In some embodiments, a lookup table 1242, such as a hash table using a page identifier as the key, is used to organize the redo log records by intended page. Thus, the lookup table 1242 may contain a Page A lookup table entry 1244, a Page B lookup table entry 1246, a Page C lookup table entry 1248, and a Page D lookup table entry 1250, as well as lookup table entries for each other page appearing in redo log records from the database master server 212. The log cache 1240 provides an interface enabling the database replica server 214 to retrieve a list of redo log records for an individual page between a start page version (e.g., a starting LSN) and an end page version (e.g., an ending LSN). Each lookup table entry 1244, 1246, 1248, 1250 has one or more associated redo log records, each of which is associated with a page version (e.g., an LSN). Thus, the Page A lookup table entry 1244 has a first redo log record at LSN=200 1252 and a second redo log record at LSN=100 1254, the Page B lookup table entry 1246 has a single redo log record at LSN=120 1256, the Page C lookup table entry 1248 has a first redo log record at LSN=200 1258 and a second redo log record at LSN=150 1260, and the Page D lookup table entry 1250 has a single redo log record at LSN=200 1262. Thus, for example, whereas the key of an entry in the lookup table 1242 may be the page identifier, the corresponding value of the entry may be a linked list chaining together the recent redo log records associated with the page.

The log cache 1240 provides an efficient lookup interface for use by the database replica server 214. Given a page identifier (e.g. "Page A", or a page ID number corresponding to Page A) and a range of page versions (e.g., starting LSN and ending LSN), the log cache 1240 may return corresponding redo log record contents for all redo log records in the corresponding lookup table 1242 entry that are within the range of page versions. For instance, if the illustrated log cache 1240 receives a lookup request from the database replica server 214 for all versions of Page A between LSN=130 and LSN=230, it will return the first redo log record 1252 of the Page A entry 1244 at LSN=200.

In some embodiments, the log cache 1240 may be used by the database replica server 214 to perform on-demand application of redo log records (e.g., redo log records 1252 and 1258) to the locally stored pages (e.g., Page A 1232 and Page C 1236) in the replica buffer pool 1214. This on-demand redo log record application process is described in greater detail below with reference to FIG. 7.

In some embodiments, the log cache 1240 may be flushed or cleaned up using a cleanup or log eviction process to evict historical redo log record versions when the memory available to the log cache 1240 is running low. In some embodiments, the cleanup process can proactively evict redo log records (e.g., the oldest un-applied redo log records) when there is no memory space available to register new redo log records. It will be appreciated that other reactive and/or proactive methods of deprecating, overwriting, or flushing contents of the log cache 1240 may be used in various embodiments.

The log cache 1240 may be logically independent of the various components shown in FIG. 2. The log cache 1240 may run within the same logical process as the functions of the database replica server 214, as a separate process on the database replica server 214, or even on a different node within FIG. 2 or FIG. 1, as long as the database replica server 214 is configured to communicate with the log cache 1240. In a cloud database 200 with multiple database replica servers 214, each such database replica server 214 could have its own log cache 1240, or a single log cache 1240 could be shared by multiple database replica servers 214. In a multi-master database configuration, a single log cache 1240 could also be shared by multiple database master servers 212 to support the data page synchronization functions of those database master servers 212 when they are acting as database replica servers 214.

In some embodiments, the log cache 1240 is stored fully in memory. In other embodiments, the log cache 1240 may be stored with some parts in memory and some parts on fast accessible external storage, or entirely on fast accessible external storage with memory-based caching.

Example Methods for Redo Log Record Registration into Log Cache

When new transactions are committed by the database master server 212, the corresponding redo log records are flushed from the master buffer pool 1212 and must be registered into the log cache 1240. Registration of new redo log records into the log cache 1240 may be done after the database master server 212 writes the redo log records into cloud storage (e.g., log store(s) 234 and page store(s) 232), and before the database replica server(s) 214 make the corresponding changes visible to transactions (i.e., read requests received from clients). In some embodiments, the database master server 212 can register the redo log records into the log cache 1240 while writing the redo log records into cloud storage. However, if the commit fails such that the changes are not written to cloud storage, a roll-back mechanism must be used to remove the uncommitted redo log records from the log cache 1240.

Two alternative example methods are described for registering redo log records to the log cache 1240. The first example method, shown in FIG. 6A, uses the database master server 212 to register the redo log records into the log cache 1240. The second example method, shown in FIG. 6B, uses a database replica server 214 associated with the log cache 1240 to register the redo log records into the log cache 1240.

Figure 6A:
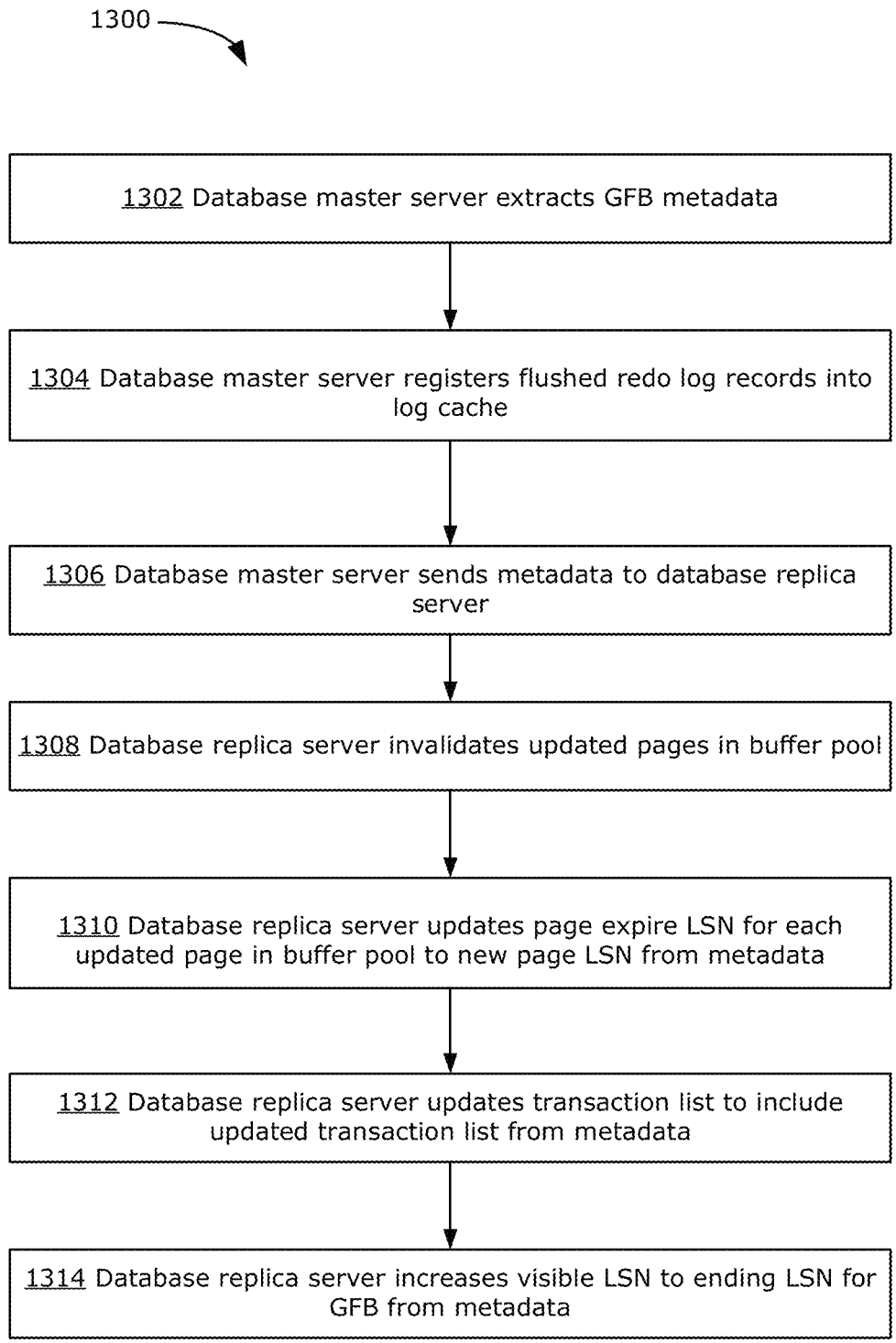
FIG. 6A is a flowchart showing steps of a first example method for registering redo log records to a log cache using the database master server, in accordance with example embodiments described herein.

FIG. 6A is a flowchart showing steps of a first example method 1300 for registering redo log records to the log cache 1240 using the database master server 212. It will be appreciated that steps involving communication to or from the database master server 212 may be performed by the master SAL 222 in some embodiments, and that steps involving communication to or from a database replica server 214 may be performed by the replica SAL 223 in some embodiments.

At 1302, the database master server 212 processes the GFB being flushed to extract metadata. The metadata may include an updated transaction list including sequential transactions up to an ending LSN for the GFB. The updated transaction list may include transactions that were committed or rolled back during the GFB window (i.e. up to the ending LSN for the GFB). The metadata may also include, for each page modified by the redo log records of the GFB, a page identifier (e.g. page ID number), a previous page LSN, and a new page LSN.

At 1304, the database master server 212 registers (i.e. stores) the redo log records flushed from the GFB into the log cache 1240 and waits for an acknowledgement from the log cache 1240. In some embodiments, this step can be performed in parallel with step 1302.

At 1306, in response to receiving an acknowledgement from the log cache 1240, the database master server 212 sends the metadata to the database replica server 214 (e.g., via arrow 202 of FIG. 2).

At 1308, the database replica server 214 invalidates pages in the replica buffer pool 1214 that are identified as being updated in the metadata (e.g., pages whose page ID numbers appear in the metadata).

At 1310, the database replica server 214 sets the page expire LSN for each page invalidated at step 1306 to the value of the new page LSN from the corresponding page identified in the metadata. In some embodiments, steps 1308 and 1310 are a single step, and pages are invalidated by setting the page expire LSN to the value of the new page LSN. A page in the replica buffer pool 1214 is invalidated by updating its expire LSN from its starting value (e.g., a value of MAX indicating that the page was fully up to date with an expire LSN equal to the last set of redo log records received by the database replica server 214) to the LSN of the new page (e.g., the ending LSN of the GFB of the current set of redo log records). A page in the replica buffer pool 1214 with an expire LSN less than MAX indicates that the page is no longer the latest version; a newer version of the page exists, and the LSN of the redo log record that updates the page is equal to the page's expire LSN.

At 1312, the database replica server 214 updates its locally stored transaction list to include the updated transaction list included in the metadata.

At 1314, the database replica server 214 increases its visible LSN to the value of the ending LSN for the GFB included in the metadata. The new value of the visible LSN allows read requests received by the database replica server 214 to access the new versions of pages updated by the received metadata.

In some embodiments, several continuous GFBs can be processed together to optimize the processing of metadata at the database replica server 214. If two GFBs are continuous, the last redo log record of the first GFB and the first redo log record of the second GFB must be continuous in a global redo log record sequence, meaning that there are no additional redo log records between these two redo log records. This may be represented in some embodiments by a global LSN index, such that two GFBs are considered continuous if the LSN of the last redo log record of the first GFB is immediately prior to the LSN of the first redo log record of the second GFB.

Figure 6B:
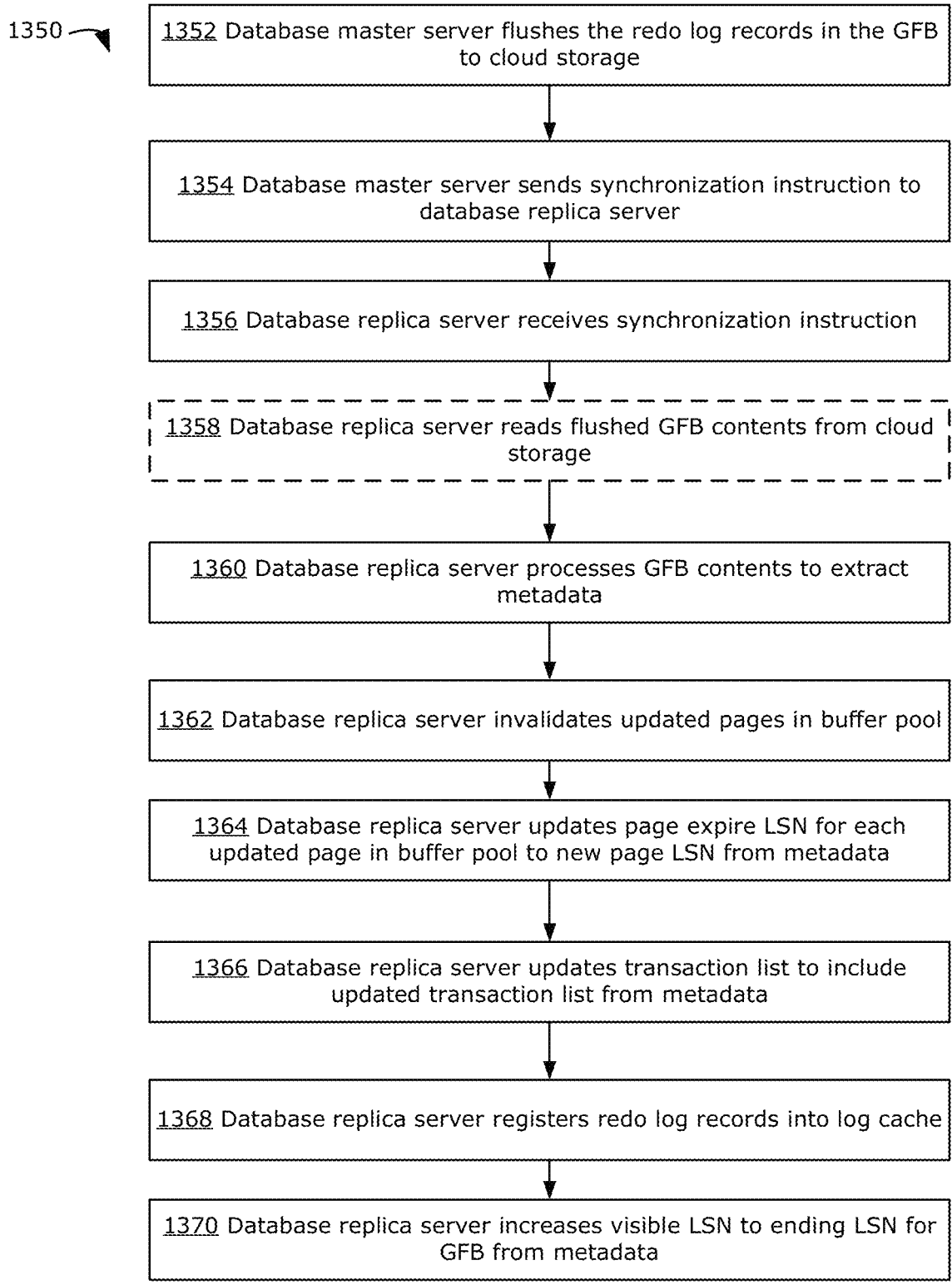
FIG. 6B is a flowchart showing steps of a second example method for registering redo log records to a log cache using a database replica server associated with the log cache, in accordance with example embodiments described herein.

FIG. 6B is a flowchart showing steps of a second example method 1350 for registering (i.e. storing) redo log records to the log cache 1240 using a database replica server 214 associated with the log cache 1240. As in method 1300, it will be appreciated that steps involving communication to or from the database master server 212 may be performed by the master SAL 222 in some embodiments, and that steps involving communication to or from a database replica server 214 may be performed by the replica SAL 223 in some embodiments.

At 1352, the database master server 212 flushes the redo log records in the GFB to cloud storage, e.g., the page store(s) 232 and log store(s) 234.

At 1354, the database master server 212 sends a synchronization instruction to the database replica server 214. The synchronization instruction may include the location of the flushed redo log records in cloud storage, as well as the end LSN of the flushed GFB contents. In the alternative, in some embodiments, the synchronization method may include the flushed GFB contents (i.e. the redo log records flushed from the GFB).

At 1356, the database replica server 214 receives the synchronization instruction.

At 1358, in embodiments wherein the flushed GFB contents are not included in the synchronization instruction, the database replica server 214 reads the flushed GFB contents from cloud storage. This step may be omitted in embodiments wherein the flushed GFB contents are included in the synchronization instruction.

At 1360, the database replica server 214 processes the GFB contents to extract metadata from it, as identified at step 1302 of method 1300 above. The metadata may include an updated transaction list including sequential transactions up to an ending LSN for the GFB. The metadata may also include, for each page updated by the redo log records, an updated page identifier (e.g. page ID number), a previous page LSN, and a new page LSN.

At 1362, the database replica server 214 invalidates pages in the replica buffer pool 1214 that are identified as being updated in the metadata (e.g., pages whose page ID numbers appear in the updated transaction list). In some embodiments, step 1362 may be identical or equivalent to step 1308 of method 1300.

At 1364, the database replica server 214 sets the page expire LSN for each page invalidated at step 1306 to the value of the new page LSN from the corresponding transaction list entry in the metadata. In some embodiments, step 1364 may be identical or equivalent to step 1310 of method 1300. As with steps 1308 and 1310 of method 1300 above, steps 1362 and 1364 may be a single step in some embodiments, and pages may be invalidated by updating their expire LSN.

At 1366, the database replica server 214 updates its locally stored transaction list to include the updated transaction list included in the metadata. In some embodiments, step 1362 may be identical or equivalent to step 1312 of method 1300.

At 1368, the database replica server 214 registers (i.e. stores) the redo log records flushed from the GFB into the log cache 1240 and waits for an acknowledgement from the log cache 1240. In some embodiments, this step can be performed in parallel with steps 1360 through 1366.

At 1370, the database replica server 214 increases its visible LSN to the value of the ending LSN for the GFB included in the metadata. The new value of the visible LSN allows read requests received by the database replica server 214 to access the new versions of pages updated by the received metadata. In some embodiments, step 1362 may be identical or equivalent to step 1314 of method 1300.

In some embodiments, as in method 1300, several continuous GFBs can be processed together to optimize the processing of metadata at the database replica server 214.

Example Method for On-Demand Redo Log Record Application

In some embodiments, the database replica server 214 performs on-demand redo log record application to locally stored pages (e.g., in the buffer pool) in response to receiving read requests. When a read request for a particular page is received from a client, the database replica server 214 retrieves a copy of the page stored in the replica buffer pool 1214, looks up the page in the lookup table 1242 of the log cache 1240, and applies any redo log records associated with the lookup table entry for the page that are required to bring the last version of the page in the replica buffer pool 1214. If the requested page is not present in the replica buffer pool 1214, the database replica server 214 may retrieve the last version of the page stored in the page store(s) 232. The page requested in the read request may be referred to as the "desired page". In some embodiments, the read request may specify a version (e.g. LSN) of the desired page; the specified version of the page may be referred to as the "desired version".

In some embodiments, the replica buffer pool 1214 may store multiple versions of pages. For example, with reference to FIG. 5, multiple versions of Page A may be generated and stored in the replica buffer pool 1214 as the Page A redo log records 1252, 1254 stored in the lookup table 1242 of the log cache 1240 are applied to existing versions of Page A stored in the replica buffer pool 1214. For example, the version of Page A 1232 shown in FIG. 5 corresponds to LSN=100 or, more precisely to the LSN range [100,200) (i.e. beginning at and inclusive of LSN 100, up to and exclusive of LSN 200). Once the first Page A redo log record 1252 in the log cache 1240 is applied to the existing version of Page A 1232, a second version of Page A (not shown) may be generated corresponding to the LSN range [200, MAX). For each page version, the LSN range is shown as a close-open range [starting LSN, expire LSN).

In described embodiments of a method for synchronizing data of the database replica server 214, the database replica server generates an updated version of a page only when the page is requested by a client. If no transaction being processed by the database replica server 214 (i.e. no read request from a client) requires access to an updated version of a given page, there is no need to generate an updated version of the given page. On-demand generation of updated page versions may reduce unnecessary buffer pool usage (i.e. memory usage and/or memory input and output), and may also reduce processor resource (e.g., CPU cycles) usage by the database replica server 214. When a set of transactions (i.e. read requests) being processed by the database replica server 214 need to access updated versions of various pages, multiple transaction threads can concurrently generate updated versions of each desired page without any constraint as to a pre-defined number of threads for redo log record application. This lack of constraint as to the number of concurrent redo log application threads may distribute the overall redo log application overhead among all of the individual transactions. Because the generation of an updated version of an individual page through application of redo log records takes only a small amount time (e.g., dozens of microseconds at most in some embodiments), the additional overhead attributable to each transaction is negligible, and so the transaction response time is unaffected. In addition, because the application of redo log records is not part of the critical path of advancing the visible LSN of the database replica server 214, data visibility lag is reduced. Furthermore, by using a log cache 1240, the load on cloud storage may be reduced when retrieving older version of pages, as the page store(s) 232 may not need to apply all currently received redo log records to generate the older page version. For the same reason, query throughput may also be improved by reducing the delay in retrieving older versions of pages. Thus, example embodiments described herein may provide consistently high query throughput and/or smaller data visibility lag than existing approaches to data synchronization of database replica servers.

Figure 7:
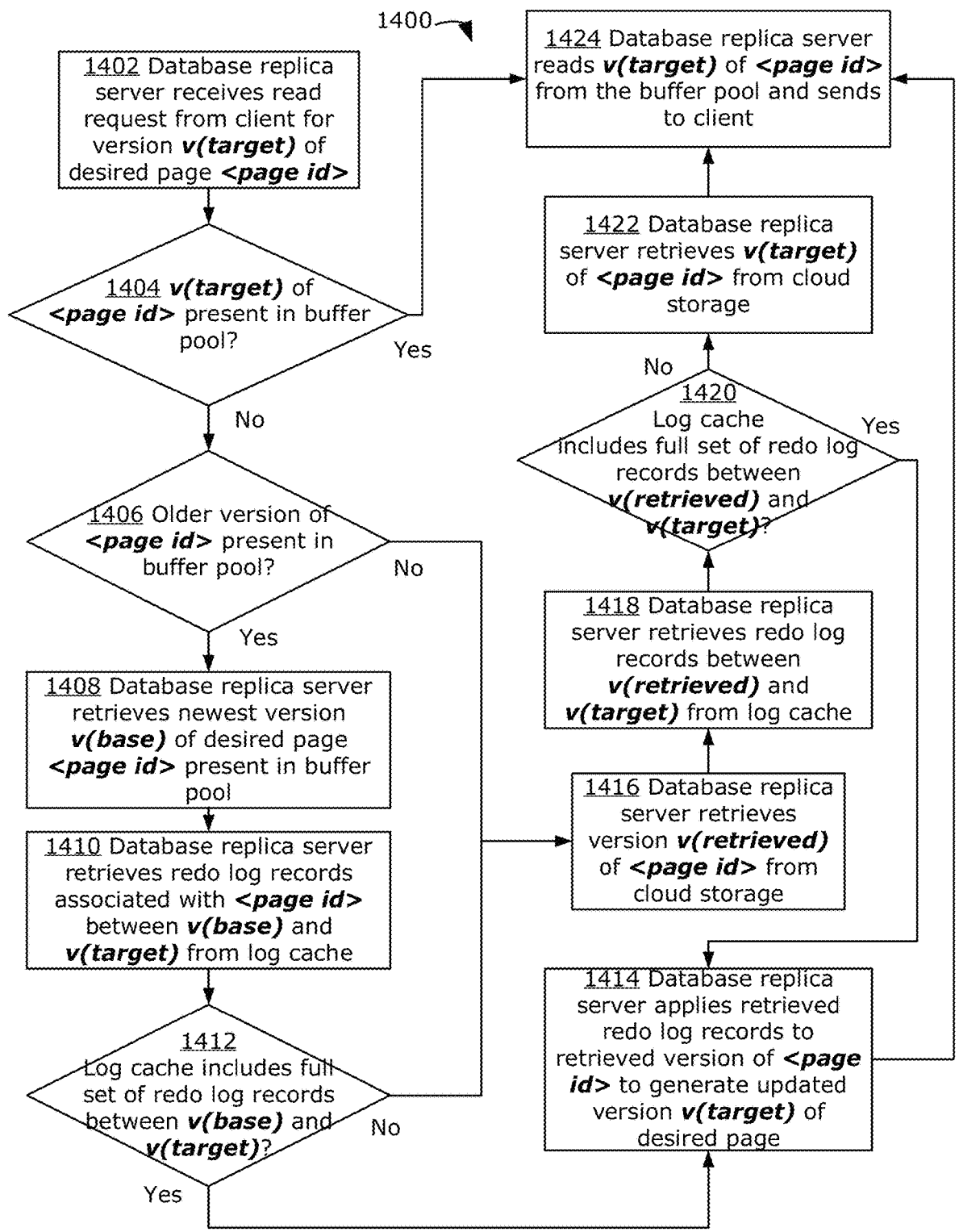
FIG. 7 is a flowchart showing steps of an example method for data synchronization of a database replica server using on-demand application of redo log records, in accordance with example embodiments described herein.

FIG. 7 is a flowchart showing steps of an example method 1400 for data synchronization of a database replica server using on-demand application of redo log records.

At 1402, the database replica server 214 receives a read request from a client. The read request includes an identifier associated with a desired page (e.g., a page ID number), denoted herein as . In some embodiments, the read request includes a version identifier (such as an LSN), denoted herein as v(target), for the desired page (e.g., a log sequence number) identifying a version of the desired page being requested.

At 1404, the database replica server 214 determines whether the requested version v(target) of desired page  is present in the replica buffer pool 1214. If version v(target) of desired page  is present in the replica buffer pool 1214, the method 1400 proceeds to step 1424, otherwise the method 1400 proceeds to step 1406.

At 1406, the database replica server 214 determines whether an older version of desired page  is present in the replica buffer pool 1214. If so, the method 1400 proceeds to step 1408, otherwise the method 1400 proceeds to step 1416.

At 1408, the database replica server 214 retrieves the newest version (e.g., LSN) v(base) of desired page  present in the replica buffer pool 1214, wherein v(base) is lower (i.e. older) than v(target).

At 1410, the database replica server 214 retrieves one or more redo log records associated with desired page  from the log cache. In some embodiments, the log cache may provide a log cache software interface that receives a page identifier, a start version identifier, and an end version identifier, and returns all redo log records associated with the page identified by the page identifier having version identifiers between the start version identifier and end version identifier. Thus, for example, the database replica server 214 may pass the parameters (, v(base), v(target)) to the log cache software interface. In response, the log cache software interface may return all redo log records stored in the lookup table 1242 in a lookup table entry with key  having an LSN value between v(base) and v(target).

At 1412, the database replica server 214 determines whether the log cache includes a full set of redo log records within the specified version range. In some embodiments, this condition may be assessed with reference to the visible LSN of the database replica server 214 (or another indicator of the latest page version registered in the log cache 1240); in such embodiments, step 1412 may be performed before step 1410. However, in other embodiments this assessment may only be made after retrieving the redo log records from the log cache 1240 at step 1410. If the log cache 1240 does not contain redo log records sufficient to update the desired page  from version v(base) to the requested version v(target), the method 1400 proceeds to step 1416, otherwise the method 1400 proceeds to step 1414.

At 1414, the database replica server 214 applies the retrieved redo log records from the log cache 1240 to the retrieved stored version v(base) of the desired page  to generate an updated desired page, i.e. requested version v(target) of desired page . The updated desired page is stored in the replica buffer pool 1214.

At 1416, in response to determining (at step 1406) that the replica buffer pool 1214 does not contain any version of the desired page, or determining (at step 1412) that the log cache 1240 does not contain redo log records sufficient to update the locally stored version v(base) of the desired page  to requested version v(target), the database replica server 214 retrieves a copy of the desired page from cloud storage (e.g., from the page store(s) 232). In some embodiments, the desired page is retrieved from storage by sending a page read request to a page store 232 where the desired page is stored. The page read request includes the parameters (, v(cached), and v(target)). In some embodiments, v(cached) is the redo log record with the lowest (i.e. earliest) version (e.g., LSN) of all redo log records stored in the lookup table 1242 in association with the lookup table entry for the desired page . In some embodiments, to be more conservative, v(cached) can be a newer (i.e. higher) version (e.g., LSN), but in any case v(cached) needs to be smaller than or equal to v(target).

In response to the read request from the database replica server 214, the page store 232 returns a version of the desired page  higher than version v(cached) and equal to or lower than version v(target). The version of desired page  returned by the page store 232 is denoted v(retrieved), such that v(cached)<v(retrieved)<=v(target).

At 1418, as at step 1410, the database replica server 214 again retrieves redo log records associated with desired page  from the log cache. Unlike at step 1410, the database replica server 214 seeks to retrieve all redo log records with version between v(retrieved) and v(target); thus, it may pass the parameters (, v(retrieved), v(target)) to the log cache software interface. In response, the log cache software interface may return all redo log records stored in the lookup table 1242 in a lookup table entry with key  having an LSN value between v(retrieved) and v(target).

At 1420, as at step 1412, the database replica server 214 determines whether the log cache includes a full set of redo log records within the specified version range. If the log cache 1240 does not contain redo log records sufficient to update the desired page  from version v(retrieved) to the requested version v(target), the method 1400 proceeds to step 1422, otherwise the method 1400 proceeds to step 1414.

At 1422, as at step 1416, the database replica server 214 retrieves a copy of the desired page from cloud storage (e.g., from the page store(s) 232). Unlike at step 1416, the page version requested from cloud storage is version v(target): thus, the read request may pass the parameters (, v(target), v(target)). This means that the log cache 1240 is not used; the database replica server 214 instead waits for cloud storage to be updated to the requested version v(target) of the desired page. Once cloud storage (e.g., page store 232) return version v(target) of desired page  to the database replica server 214, the method 1400 proceeds to step 1424.

At 1424, the database replica server 214 reads the updated desired page (i.e. version v(target) of desired page ) from the replica buffer pool 1214 and sends the updated desired page to the client.

The on-demand redo log records application method 1400 described above may exhibit additional advantages in addition those described above. By using on-demand redo log records application, described embodiments may remove the process of applying redo log records to update pages from the critical path of the data synchronization process for database replica servers. The lag introduced by data synchronization may thereby be significantly reduced, thereby shortening data visibility lag. The database replica server may therefore move up its visible LSN value after completing only a few minor steps—extracting metadata from redo log records flushed from the database master server's buffer, registering the flushed redo log records into the log cache, invalidating deprecated or outdated pages in the buffer pool, setting the expire LSN value for the invalid pages, and updating the locally stored list of transactions—all of which should may be completed quickly (e.g., within a few milliseconds in some embodiments).

In some embodiments, a cloud-based database with zero visibility lagging may be implemented using on-demand redo log records application. The database master server may be configured to delay sending a transaction commit notification to its client until the database replica server(s) have completed data synchronization. This may slow down the database mater server's transaction commit process, but may exhibit the advantage that transactions with the database replica server(s) may not exhibit any delay in seeing the latest updates from the database master server. Furthermore, this feature may be enabled or disabled on a per-transaction basis, such that only those clients that require no lagging can use this feature.

A similar feature may be implemented using the database replica server to achieve the same objective, namely no data visibility lag. When a read request is received by the database replica server 214 from a client, if the client requires or requests no data visibility lag, the database replica server 214 can delay the execution of the transaction (i.e. satisfaction of the read request) and trigger a data synchronization method 1300 or 1350 to get the latest redo log records committed by the database master server 212. The database replica server 214 may wait until the visible LSN has been updated to the value of the most recent LSN of the redo log records committed by the database master server 212, then allow the transaction to execute.

General

Although the present disclosure describes functions performed by certain components and physical entities, it should be understood that, in a distributed system, some or all of the processes may be distributed among multiple components and entities, and multiple instances of the processes may be carried out over the distributed system.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. In general, the software improves the operation of the hardware in one or more ways.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for serving database data of a cloud-based database comprising a compute layer and a storage layer, the compute layer comprising a database master server configured to generate redo log records and a database replica server configured to respond to client read requests, the storage layer comprising a log store configured to store the redo log records and a page store configured to store database data pages, update the database data pages based on the redo log records, and provide the updated database data pages to the database replica server, the method comprising:
   receiving from a client, at the database replica server, a read request for a desired page of database data; and
   in response to receiving the request for the desired page:
      in response to determining that neither the database replica server nor the page store currently stores an up to date version of the desired page:
         retrieving an out of date stored version of the desired page;
         retrieving one or more redo log records associated with the desired page from a log cache operating in the compute layer; and
         applying, at the database replica server, the one or more redo log records to the out of date stored version of the desired page to generate an updated desired page; and
      sending, from the database replica server to the client, the updated desired page.

2. The method of claim 1, wherein:
   the cloud-based database is a multi-master cloud-based database; and
   the database replica server is a database master server.

3. The method of claim 1, wherein the log cache is part of the database replica server.

4. The method of claim 1, wherein the log cache is part of the cloud-based database separate from the database replica server.

5. The method of claim 1, wherein the database replica server retrieves the stored version of the desired page from a buffer pool of the database replica server.

6. The method of claim 1, wherein the database replica server retrieves the stored version of the desired page from a page store of the cloud-based database.

7. The method of claim 1, further comprising, prior to retrieving the one or more redo log records associated with the desired page:
   storing a plurality of redo log records to the log cache, the plurality of redo log records comprising at least one of the one or more redo log records associated with the desired page.

8. The method of claim 7, wherein the step of storing the plurality of redo log records to the log cache is performed by a database master server.

9. The method of claim 7, wherein the step of storing the plurality of redo log records to the log cache is performed by the database replica server.

10. The method of claim 7, further comprising, prior to storing the plurality of redo log records to the log cache:
    determining that the log cache has insufficient memory available to store the plurality of redo log records; and
    evicting one or more redo log records stored in the log cache.

11. The method of claim 7, wherein:
    each redo log record of the plurality of redo log records is associated with a page;
    storing the plurality of redo log records to the log cache comprises storing each redo log record of the plurality of redo log records, in a lookup table of the log cache, in association with a lookup table entry corresponding to a page associated with the redo log record; and
    retrieving the one or more redo log records from the log cache comprises retrieving one or more redo log records stored in association with a lookup table entry corresponding to the desired page.

12. The method of claim 11, wherein:
    the stored version of the desired page is associated with a log sequence number; and
    retrieving the one or more redo log records comprises retrieving one or more redo log records stored in association with log sequence numbers higher than the log sequence number of the stored version of the desired page.

13. The method of claim 12, further comprising, prior to retrieving the one or more redo log records associated with the desired page:
    determining that the log cache has insufficient memory available to store a plurality of redo log records;
    evicting one or more redo log records stored in the log cache;
    storing the plurality of redo log records to the log cache, the plurality of redo log records comprising at least one of the one or more redo log records associated with the desired page; and
    updating a visible log sequence number of the database replica server to a value equal to an ending log sequence number associated with the plurality of redo log records.

14. A processing unit, comprising:
    a processing device; and
    a memory storing instructions that, when executed by the processing device, cause the processing unit to perform the functions of a database replica server configured to respond to client read requests for database data of a cloud-based database, the cloud-based database comprising a compute layer and a storage layer, the compute layer comprising a database master server configured to generate redo log records and the database replica server, the storage layer comprising a log store configured to store the redo log records and a page store configured to store database data pages, update the database data pages based on the redo log records, and provide the updated database data pages to the database replica server, the database replica server being further configured to:
receive, from a client, a read request for a desired page of database data; and
in response to receiving the request for the desired page:
   in response to determining that neither the database replica server nor the page store currently stores an up to date version of the desired page:
      retrieve an out of date stored version of the desired page;
      retrieve one or more redo log records associated with the desired page from a log cache operating in the compute layer; and
      apply, at the database replica server, the one or more redo log records to the out of date stored version of the desired page to generate an updated desired page; and
      send, to the client, the updated desired page.

15. The processing unit of claim 14, wherein:
the processing unit comprises the log cache; and
the instructions, when executed by the processing device, further cause the processing unit to perform the functions of a log cache.

16. The processing unit of claim 15, wherein:
the log cache comprises a plurality of stored redo log records, each stored redo log record of the plurality of stored redo log records being stored in a lookup table of the log cache in association with a lookup table entry corresponding to a page; and
retrieving the one or more redo log records from the log cache comprises retrieving one or more stored redo log records stored in association with the lookup table entry corresponding to the desired page.

17. The processing unit of claim 16, wherein:
the instructions, when executed by the processing device, further cause the processing unit to perform the functions of a buffer pool; and
the stored version of the desired page is retrieved from the buffer pool.

18. The processing unit of claim 17, wherein:
the stored version of the desired page is associated with a log sequence number; and
retrieving the one or more redo log records comprises retrieving one or more redo log records stored in association with log sequence numbers higher than the log sequence number of the stored version of the desired page.

19. The processing unit of claim 18, wherein the database replica server is further configured to, prior to retrieving the one or more redo log records associated with the desired page:
determine that the log cache has insufficient memory available to store a plurality of received redo log records;
evict one or more stored redo log records stored in the log cache;
store the plurality of received redo log records to the log cache, the plurality of redo log records comprising at least one of the one or more redo log records associated with the desired page; and
update a visible log sequence number of the database replica server to a value equal to an ending log sequence number associated with the plurality of received redo log records.

20. A non-transitory computer-readable medium storing instructions thereon to be executed by a processor device in a cloud-based database comprising a compute layer and a storage layer, the compute layer comprising a database master server configured to generate redo log records and a database replica server configured to respond to client read requests, the storage layer comprising a log store configured to store the redo log records and a page store configured to store database data pages, update the database data pages based on the redo log records, and provide the updated database data pages to the database replica server, the instructions, when executed, causing the database replica server of the cloud based database to:
receive, from a client, a read request for a desired page of database data; and
in response to receiving the request for the desired page:
   in response to determining that neither the database replica server nor the page store currently stores an up to date version of the desired page:
      retrieve an out of date stored version of the desired page;
      retrieve one or more redo log records associated with the desired page from a log cache operating in the compute layer; and
      apply, at the database replica server, the one or more redo log records to the out of date stored version of the desired page to generate an updated desired page; and
      send, to the client, the updated desired page.

* * * * *